(12) United States Patent
Li et al.

(10) Patent No.: US 8,086,270 B2
(45) Date of Patent: Dec. 27, 2011

(54) CLASSIFYING-SYNTHESIZING TRANSMISSION METHOD OF MULTI-USER FEEDBACK INFORMATION AT BASE STATION

(75) Inventors: Jifeng Li, Kanagawa (JP); Xiaohong Yu, Beijing (CN)

(73) Assignee: Panasonic Corporation, Osaka (JP)

( * ) Notice: Subject to any disclaimer, the term of this patent is extended or adjusted under 35 U.S.C. 154(b) by 856 days.

(21) Appl. No.: 11/574,636

(22) PCT Filed: Sep. 5, 2005

(86) PCT No.: PCT/JP2005/016262
§ 371 (c)(1),
(2), (4) Date: Apr. 5, 2007

(87) PCT Pub. No.: WO2006/028058
PCT Pub. Date: Mar. 16, 2006

(65) Prior Publication Data
US 2007/0254715 A1    Nov. 1, 2007

(30) Foreign Application Priority Data

Sep. 6, 2004  (CN) .......................... 2004 1 0068800

(51) Int. Cl.
H04B 1/00 (2006.01)
(52) U.S. Cl. ........ 455/561; 455/69; 455/452.2; 714/751
(58) Field of Classification Search .................. 455/561, 455/69, 452.2; 714/748–751
See application file for complete search history.

(56) References Cited

U.S. PATENT DOCUMENTS

| | | | |
|---|---|---|---|
| 6,658,619 B1 | 12/2003 | Chen | |
| 6,977,888 B1 * | 12/2005 | Frenger et al. | 370/218 |
| 7,346,035 B2 * | 3/2008 | Lee et al. | 370/331 |
| 7,359,924 B2 * | 4/2008 | Balachandran et al. | 707/203 |
| 7,386,277 B2 * | 6/2008 | Cho et al. | 455/69 |
| 2002/0098860 A1 * | 7/2002 | Pecen et al. | 455/522 |
| 2003/0214930 A1 | 11/2003 | Fischer | |
| 2006/0227743 A1 * | 10/2006 | Ishimori et al. | 370/331 |
| 2007/0230516 A1 * | 10/2007 | Torsner et al. | 370/538 |

FOREIGN PATENT DOCUMENTS

| | | |
|---|---|---|
| CN | 1332540 | 1/2002 |
| CN | 1394088 | 1/2003 |

(Continued)

OTHER PUBLICATIONS

International Search Report dated Nov. 8, 2005.

(Continued)

*Primary Examiner* — Lester Kincaid
*Assistant Examiner* — Steven Kelley
(74) *Attorney, Agent, or Firm* — Dickinson Wright PLLC (57) ABSTRACT

A classifying-synthesizing transmission method of multi-user feedback information at a base station. At the base station, a classifier (554) classifies users into a plurality of kinds on the basis of different efficiencies at the time when the base station transmits information to the users. On the basis of the characteristics of synthetic data, a compressor (555) compresses the information synthesized, to reduce the quantity of information to be transmitted. A synthesizer (556) again synthesizes the compressed data of different user kinds. An encoder (557) adds redundant information to the feedback information to be transmitted. A transmitter (524) transmits the encoded feedback information to all users. As a result, the quantity of communication of a downward feedback channel can be drastically reduced to spare the use of radio resources.

14 Claims, 6 Drawing Sheets

FOREIGN PATENT DOCUMENTS

| | | |
|---|---|---|
| JP | 8251146 | 9/1996 |
| JP | 2002190774 | 7/2002 |
| JP | 200360655 | 2/2003 |

OTHER PUBLICATIONS

Office Action on corresponding Chinese Patent Application dated Jun. 5, 2009.

European Search Report dated Aug. 25, 2011.

K. Balachandran, et al., "Efficient Transmission of Arq Feedback for EGPRS Radio Link Control," IEEE VTS 50th Amsterdam, Netherlands, Vehicular Technology Conference, IEEE, Sep. 1999, vol. 3, pp. 1663-1669.

* cited by examiner

CLASSIFYING-SYNTHESIZING TRANSMISSION METHOD OF MULTI-USER FEEDBACK INFORMATION AT BASE STATION

TECHNICAL FIELD

The present invention relates to a method of classifying, synthesizing and transmitting multi-user feedback information at a base station of mobile communication systems. More particularly, the present invention relates to a method of synthesizing feedback information for multi-users per type at a base station, compressing the synthesized information using a compression method suitable for data characteristics, and re-synthesizing and transmitting the result.

BACKGROUND ART

In the conventional mobile communication, a poor radio channel environment causes decreased reliability or time fluctuation of radio channels, and channel encoding and error correction techniques are therefore required. Currently, a hybrid automatic repeat request (HARQ) technique is a relatively common technique that combines automatic repeat request (ARQ) technique and forward error correction (FEC) technique are combined, thereby performing error detection and correction. Hybrid automatic repeat request techniques are presently classified in three types. Type I discards a packet that is not received correctly on the receiving side, makes the transmission side retransmit a copy of the packet by returning a negative acknowledgement (NACK: error), and decodes the newly received packet independently. Type II does not discard the packet resulted in an error on the receiving side and performs decoding by synthesizing it with retransmitted information. Type III is able to synthesize retransmitted information with a packet transmitted before, and the retransmitted packet includes all information necessary for receiving data correctly.

When channel error correction is performed using HARQ, the transmission side first transmits the coded information to the receiving side, and the receiving side receives the information and then performs error correction decoding on the information. When data is received correctly, the receiving side receives the information and, at the same time, transmits an acknowledgement (ACK: no error) to the transmission side, and, when an error is not corrected, the receiving side transmits a negative acknowledgement (NACK: error) and requests data retransmission for the transmission side, and the receiving side performs decoding based on the received retransmission data.

Figure 1:
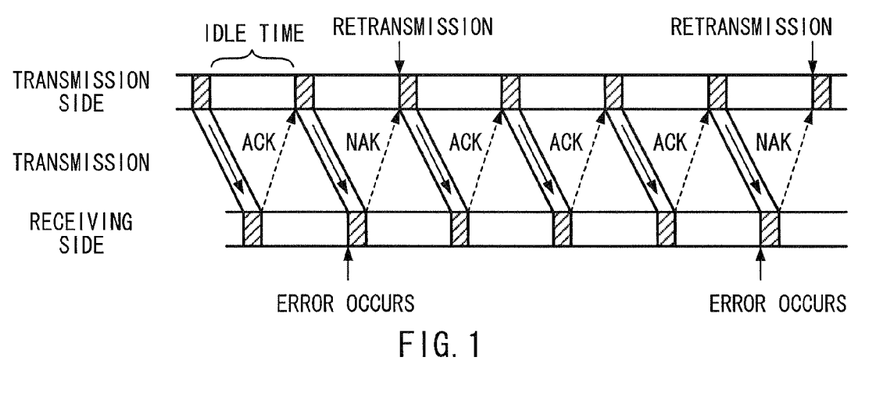
FIG. 1 shows a stop-and-wait ARQ retransmission scheme.

FIG. 1 shows a stop-and-wait ARQ retransmission scheme. With this method, the transmission side transmits protocol data unit (PDU) and then waits until the receiving side returns acknowledgment information. The receiving side returns ACK information upon receiving the data unit correctly. The transmission side receives the ACK information and then transmits the next PDU. The receiving side returns NACK information upon receiving the data incorrectly, and the transmission side receives the NACK information and then retransmits the PDU. Although this method is easy to implement, it is inefficient because the transmission side needs to wait until acknowledgment information is returned.

Figure 2:
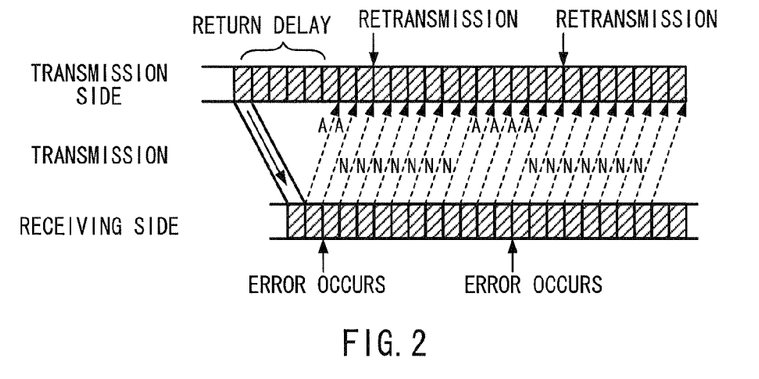
FIG. 2 shows a go-back-N automatic repeat ARQ retransmission scheme.

FIG. 2 shows a go-back-N automatic repeat ARQ retransmission scheme. With this method, the transmission side does not wait until acknowledgment information is returned from the receiving side, and transmits N PDU's sequentially. When the receiving side cannot receive a PDU correctly, the transmission side retransmits the PDU that resulted in an error and subsequent N-1 PDU's that have been transmitted. At the same time, the receiving side discards the PDU that resulted in an error and the subsequent N-1 PDU's. This method has a large round trip delay, and, when an error occurs in one PDU, N PDU's have to be retransmitted, and, consequently, it is hardly efficient.

Figure 3:
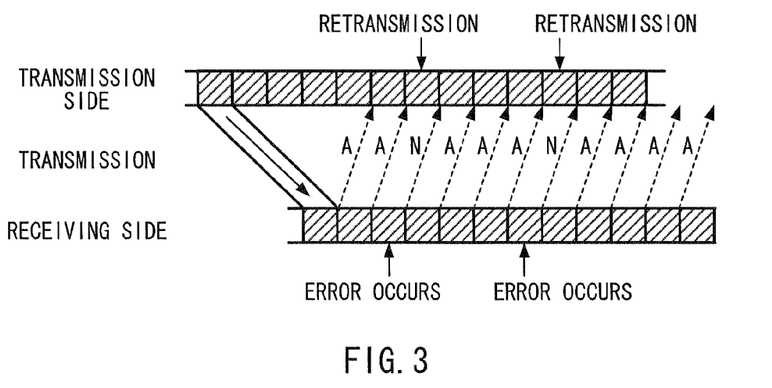
FIG. 3 shows a selective-repeat ARQ retransmission scheme.

FIG. 3 shows a selective-repeat ARQ retransmission scheme. With this method, PDU's on the transmission side are similarly transmitted sequentially. However, when an error occurs, only a PDU that resulted in an error is retransmitted. Then, after retransmission, the transmission side continues to transmit a new PDU. This method is efficient but requires reordering of PDU's when they are transmitted to users, and a buffer needs to be provided on the receiving side for storing PDU's that are not resulted in an error, after the PDU that resulted in an error.

Figure 4:
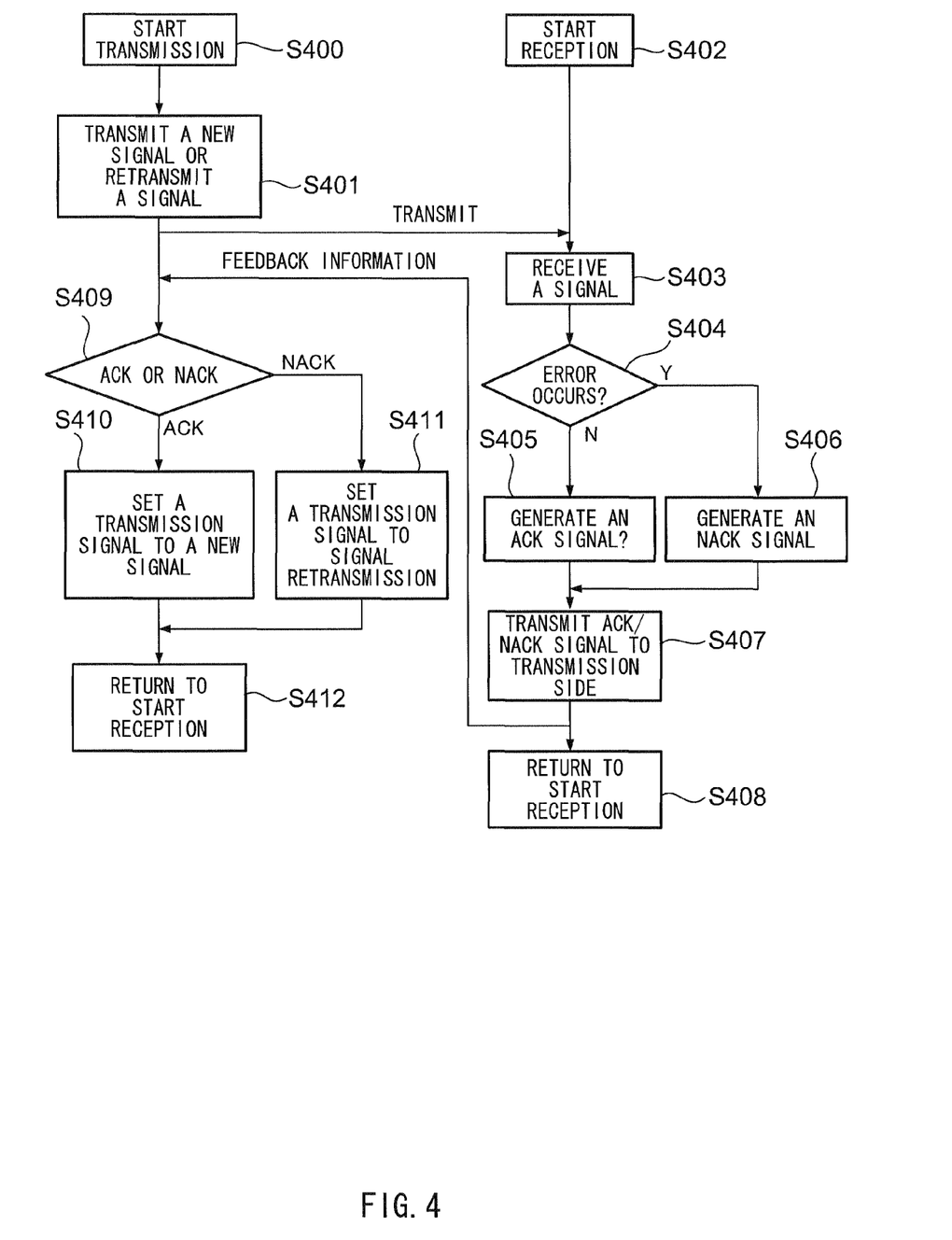
FIG. 4 is a flowchart of the conventional ARQ operations.

FIG. 4 is a flowchart of the conventional ARQ operations. In FIG. 4, when the steps of starting transmission start operating (S400), the receiving side transmits a new signal or retransmits a signal based on the setting (S401). The receiving side starts receiving start operating (S402), receives a signal transmitted from the transmission side (S403), and determines whether or not the received signal has an error (S404). When there is no error, an ACK feedback signal is generated (S405), and, when there is an error, an NACK feedback signal is generated (S406). Then, the generated feedback information is transmitted to the transmission side (S407), and the receiving side reenters the state of starting reception (S408). The transmission side receives the feedback information and then determines whether the received signal is an ACK signal or a NACK signal (S409). If the received signal is an ACK signal, new data is set as transmission content (S410), and, if the received signal is not an ACK signal, the transmitted signal is set as retransmission data (S411). The transmission side returns to the state of starting transmission (S412) and continues transmitting information.

With the above-described retransmission scheme, channels have to be provided between the transmission side and the receiving side to transmit ACK/NACK acknowledgment information in opposite directions. When the user is on the transmission side and the base station is on the receiving side, channels between the base station and users are provided to transmit feedback information. In general, feedback information ACK/NACK is indicated by one or more bits.

With the conventional mobile communication network, the base station receives a large amount of data transmitted from mobile stations. After receiving the data, the base station has to transmit ACK/NACK information to each mobile station that transmitted data. Due to this large amount of acknowledgment information, a large amount of radio resources are consumed. Radio resources are being more valuable day by day, and how to make effective use of the resources is an important problem.

DISCLOSURE OF INVENTION

Problems to be Solved by the Invention

It is therefore an object of the present invention to provide a method of classifying, synthesizing and transmitting multi-user feedback information at the base station to transmit ACK/NACK acknowledgment information of a plurality of users efficiently in downlink channels of the radio communication system.

A method of classifying, synthesizing and transmitting multi-user feedback information at a base station of the present invention, has the steps of: classifying users according to a specific standard; synthesizing feedback information to be transmitted to users, for each different type; compressing the synthesized feedback information; re-synthesizing the compressed feedback information; encoding the re-synthesized feedback information; and transmitting the encoded feedback information to the users.

Users in the same cell have different information transmission rates. Consequently, although a user having good signals has an excellent information transmission rate, a user on the cell edge has poor signals and receives feedback information where NACK's are dominant. To perform compression more efficiently based on data characteristics, with the present invention, the base station first classifies acknowledgment information of a plurality of users in the same cell to N types, synthesizes the acknowledgement information of each type, compresses the synthesized acknowledgment information based on data characteristics of each, re-synthesizes the different types of the compressed data, and transmits the results via radio channels. Although one feedback channel is conventionally assigned to a user, by this means, it is possible to share a feedback channel with a plurality of users. Also, by compressing the synthesized multi-user information, it is possible to reduce feedback information to be transmitted significantly, thereby saving use of radio resources.

The specific standard may preferably include transmission rate of the user—for example, an SNR value of a user signal, Doppler shift of the user, or other measurement values.

Also, compression may preferably be performed on feedback information of different user types using different compression methods.

Further, the compression method may preferably be provided as a compression coding algorithm that is able to shorten the length of information effectively.

Furthermore, the coding may preferably be error correction coding.

According to another aspect of the present invention, a method of receiving classified user feedback information transmitted from a base station at a mobile station has the steps of: receiving the information transmitted from the base station; performing error correction decoding on the received information; decompressing the information after the error correction decoding; and extracting from the decompressed information feedback information for this mobile station from the base station.

The decoding step preferably includes error correction detection for the received data. When the error correction detection step is successful, the processing continues to the next step. On the other hand, when the error correction detection step fails, retransmission of the part which is not correctly decoded is requested for the base station.

According to another embodiment of the present invention, a base station that classifies, synthesizes, and transmits multi-user feedback information has: a multi-user feedback information classifier that classifies users based on a specific standard so that feedback information for a plurality of users is collected for each type; a classified feedback information compressor that performs data compression on feedback information synthesized using an appropriate compression method based on characteristics of different types of synthesized feedback information; a classified feedback information synthesizer that re-synthesizes the compressed classified feedback information; a redundant information encoder that adds redundant information to feedback information to be transmitted to enable error correction detection at a receiving side; and a transmitter that transmits the coded feedback information to the users.

The base station may preferably include, as the specific standard, transmission rate of the user—for example, an SNR value of a user signal, Doppler shift of a user, or other measurement values.

Further, the compression method may preferably be provided as a compression coding algorithm that is able to shorten the length of information effectively.

According to another embodiment of the present invention, a mobile station that classifies, synthesizes and transmits multi-user feedback information has: an information receiving section that receives information transmitted from a base station; an information decoding section that decodes the received information; a decompressing section that decompresses the decoded information; and a feedback information extracting section that extracts from the decompressed information the feedback information from the base station to this mobile station.

Preferably, error correction detection step is performed on the received data, and, when the error correction detection operation fails, retransmission of a part which is not correctly decoded is requested for the base station.

BEST MODE FOR CARRYING OUT THE INVENTION

An embodiment of the present invention will be described below in detail with reference to the accompanying drawings. The embodiment below is described for the purpose of explanation, and this does not limit the scope of the invention.

To save the use of radio resources, the present invention proposes a method of synthesizing user acknowledgment information in the cell for each of a plurality of types, compressing the synthesized information based on the data characteristics, re-synthesizing the compressed information, and transmitting the results to the users. These plurality of types are classified according to information transmission rates. For example, a user having more ACK's in feedback information is one type; a user having basically equal amounts of ACK information and NACK information is another type; and a user having more NACK's in feedback information is still another type. By this classification, user feedback information having the same data transmission characteristics is synthesized. The information transmission rate that is referred to upon classification may be the SNR value of an uplink signal of the user, the Doppler shift of the user, other measurement values, or a combination of a plurality of the measurement values.

The present invention employs technique of compressing and transmitting classified and synthesized acknowledgment information. The purpose of compression is to transmit information using the smallest possible number of codes (bits) and increase information transmission rate. The coding theorem in communication theory already proves in theory that optimal coding or information processing methods that are able to realize effective and reliable information transmission exist. Nowadays, various coding and compression methods including, for example, the Huffman coding algorithm, are proposed. The Huffman coding algorithm is able to realize optimal information source coding whereby a code satisfies prefix conditions and the average coding length is minimum. Also, the Lempel-Ziv algorithm, which is widely used for file compression for computers, is also an example. Both of these coding algorithms are able to shorten the length of information effectively. Accordingly, the present invention is able to reduce the amount of information for transmission and save radio resources by combining these compression algorithms and transmitting information effectively.

Figure 5:
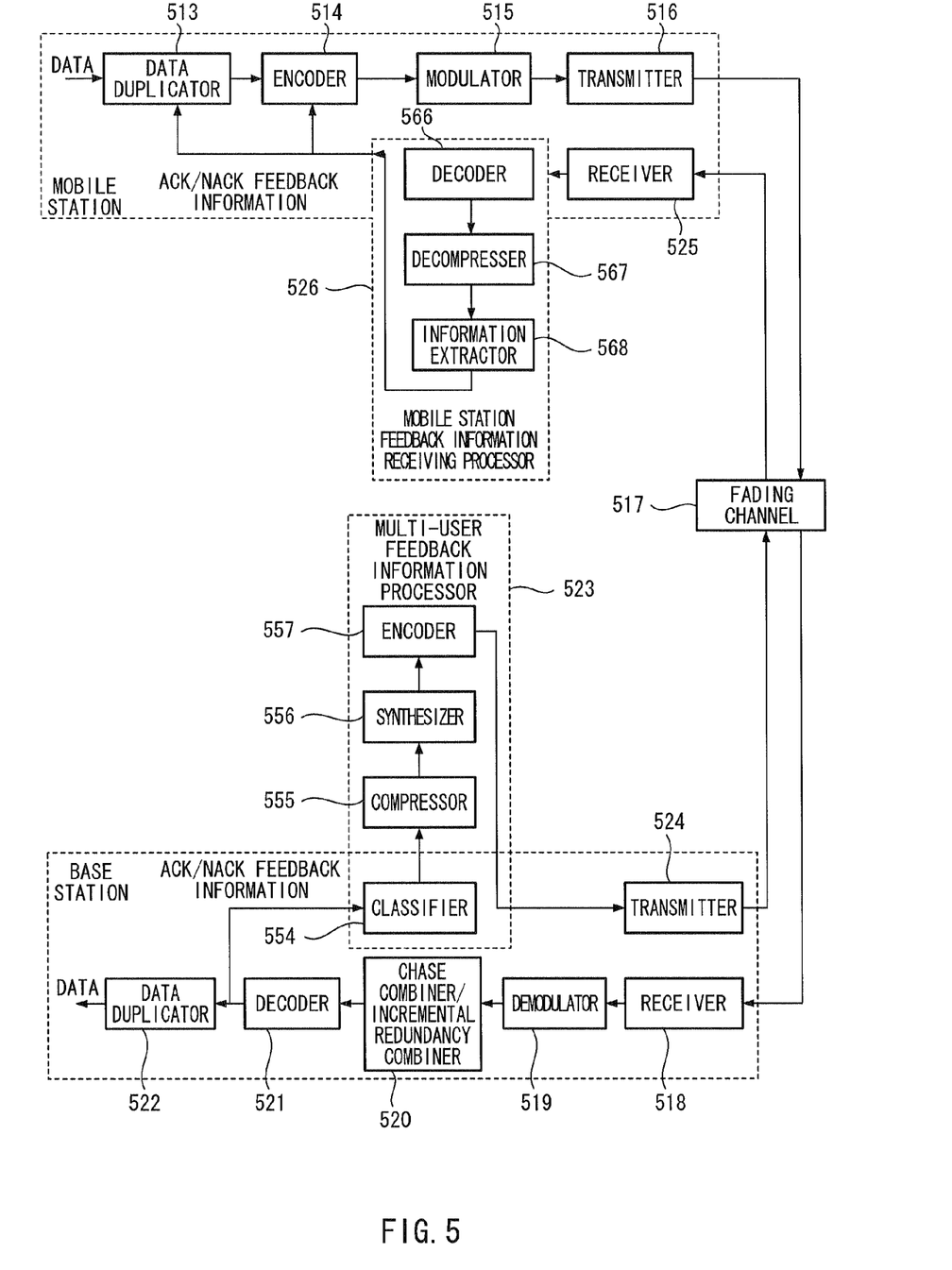
FIG. 5 shows a mobile communication system according to an embodiment of the present invention.

FIG. 5 shows a configuration of a mobile communication system according to the present invention. FIG. 5 shows a configuration of the mobile station in the upper half and a configuration of the base station in the lower half.

The base station part has: classifier 554, compressor 555, synthesizer 556, encoder 557, and transmitter 524.

After the user transmits data to the base station, the base station decodes the received data and has to immediately feed back a feedback information ACK/NACK indicating whether or not the base station is able to decode the data correctly to the user. Classifier 554 classifies users to a plurality of types based on different rates at a time the base station transmits information to the users. The classification is based on the SNR value of the users measured by the bases station, the Doppler shift of the user, or other measurement values. Further, classifier 554 collects feedback information of the plurality of users per type.

Compressor 555 compresses the synthesized information based on the characteristics of the synthesized data, and reduces the amount of information for transmission. Different types of synthesized data have different characteristics. When ACK information and NACK information are represented by "1" and "0," respectively, the type of high transmission rate has more 1s in the synthesized data, the type of general transmission rate basically has the same numbers of 1s and 0s in the synthesized data, and the type of a low transmission rate has more 0s in the synthesized data. Compression can be performed using an appropriate compression method based on different characteristics of the synthesized data.

The operations in the relevant means at the base station part upon implementation of the classification and synthesis of feedback information of the present invention will be described below. Synthesizer 556 re-synthesizes the compressed data of different user types.

Encoder 557 adds redundant information to feedback information to be transmitted so as to enable error correction detection on the receiving side. Error control may also be performed using HARQ technique or other effective methods.

Transmitter 524 transmits the coded feedback information to all users.

The mobile station part has, for example, receiver 525, decoder 566, decompressor 567, and information extractor 568.

Receiver 525 receives the information transmitted by the base station, and the received information includes the synthesized feedback information of a plurality of users.

Decoder 566 performs error correction detection on the received information and receives the information when the information is correct. When the information is not correct, the mobile station stores the content of the correctly received part and, at the same time, requests the base station to retransmit the information that resulted in an error, synthesizes the original information and the retransmitted content, and increase the probability of receiving the information correctly.

Decompressor 567 decompresses the decoded information and restores the synthesized ACK/NACK information of a plurality of users.

Information extractor 568 extracts ACK/NACK information for the mobile station from the received information.

With the present invention, feedback information for a plurality of users is synthesized per type, compressed and then transmitted thereby reducing information to be transmitted and saving the use of radio resources.

In the mobile station part, to use data in retransmission, data duplicator 513 duplicates the data. Encoder 514 then encodes the data, and this coding may employ, for example, HARQ coding that is able to realize two functions of forward error correction (FEC)/cyclic redundancy check (CRC) and data retransmission. The coded data is modulated in modulator 515 and then transmitted via transmitter 516. The data is received at receiver 518 of the base station part via fading channel 517. Demodulator 519 then demodulates the data, and chase combiner/incremental redundancy combiner 520 performs chase combining and incremental redundancy (IR) combining. Chase combining and IR combining are two methods of HARQ, and, with chase combining, retransmission information is the same as the original information and, with IR combining, retransmission information is redundant information. Decoder 521 decodes the data after chase combining/IR combining, and to use the information again or to change the order and pass the information to the next processing step, when an error occurs in the data, the decoded data is duplicated in data duplicator 522. After the data is decoded, ACK/NACK feedback information is generated according to whether or not the data is decoded correctly. At the base station, multi-user feedback information processor 523 classifies, compresses and synthesizes feedback information from a plurality of users, and then feeds back the result to the mobile station via transmitter 524. Receiver 525 of the mobile station receives the information transmitted from the base station, and feedback information receiving processor 526 in the mobile station decompresses and performs information extraction on the feedback information, obtains feedback information for this mobile station, and supplies the feedback information to data duplicator 513 and encoder 514. When the feedback information is an ACK, encoder 514 directly encodes new data. On the other hand, when the feedback information is a NACK, encoder 514 extracts the original information from data duplicator 513, encodes the data by the HARQ method (chase combining or IR combining) used in the system, and then executes other processing steps.

Figure 6:
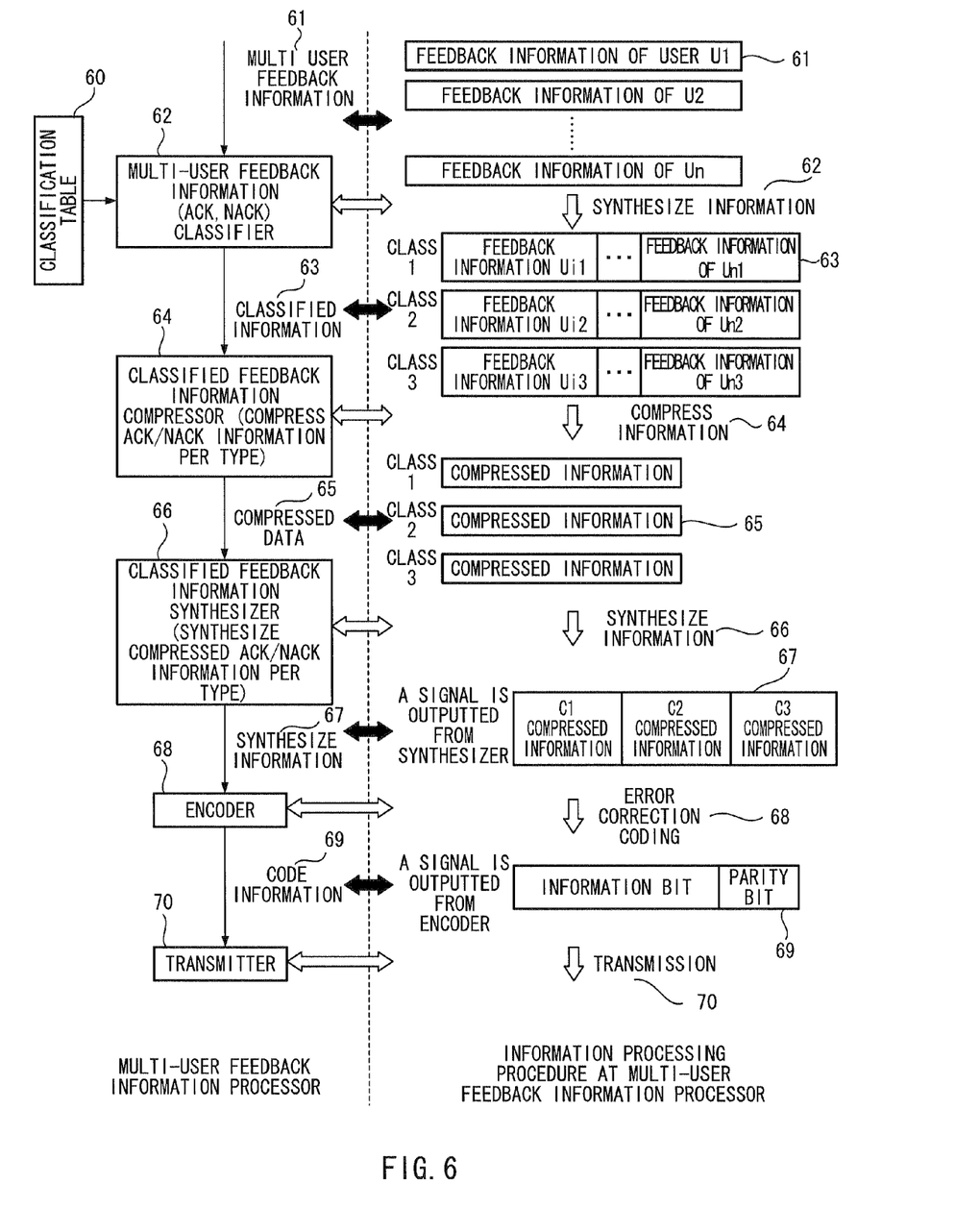
FIG. 6 shows a multi-user feedback information processor and an information processing step of the base station part shown in FIG. 5.

FIG. 6 shows a multi-user feedback information processor and information processing step at the base station. In FIG. 6, the left part and the right part show multi-user feedback information processor of the base station part shown in FIG. 5 and an information processing step at multi-user feedback information processor, respectively, and the left and the right are corresponding to each other. Also, the white bold arrows in the center show corresponding apparatuses and steps, and the black bold arrows show corresponding information. Classifier 62 first classifies multi-user feedback information 61, and this classification is performed with reference to predetermined classification table 60. After classification, three types of feedback data 63 are obtained, and each type of the feedback information is then compressed by classification information compressor 64. Classified feedback information synthesizer 66 synthesizes a plurality of types of compressed information 65. The encoder performs error correction coding 68 on synthesized information 67 and obtains coded information 69. The information is comprised of information bits and parity bits. Transmitter 70 transmits the coded information finally.

User classification is performed with reference to the classification table. The classification table of this embodiment is set according to SNR values of the users, and, as shown Table 1, users in the base station are classified to three types. Classification may refer to SNR values of the users, the Doppler shift of the user, or other measurement values.

TABLE 1

| SNR Value | User Type |
|---|---|
| SNR > S1 | User is classified in the first class (Class 1) |
| S2 < SNR ≦ S1 | User is classified in the second class (Class 2) |
| SNR ≦ S2 | User is classified in the third class (Class 3) |

In Table 1, user classification at the base station (based on SNR values of the users) is provided as an example.

Figure 7:
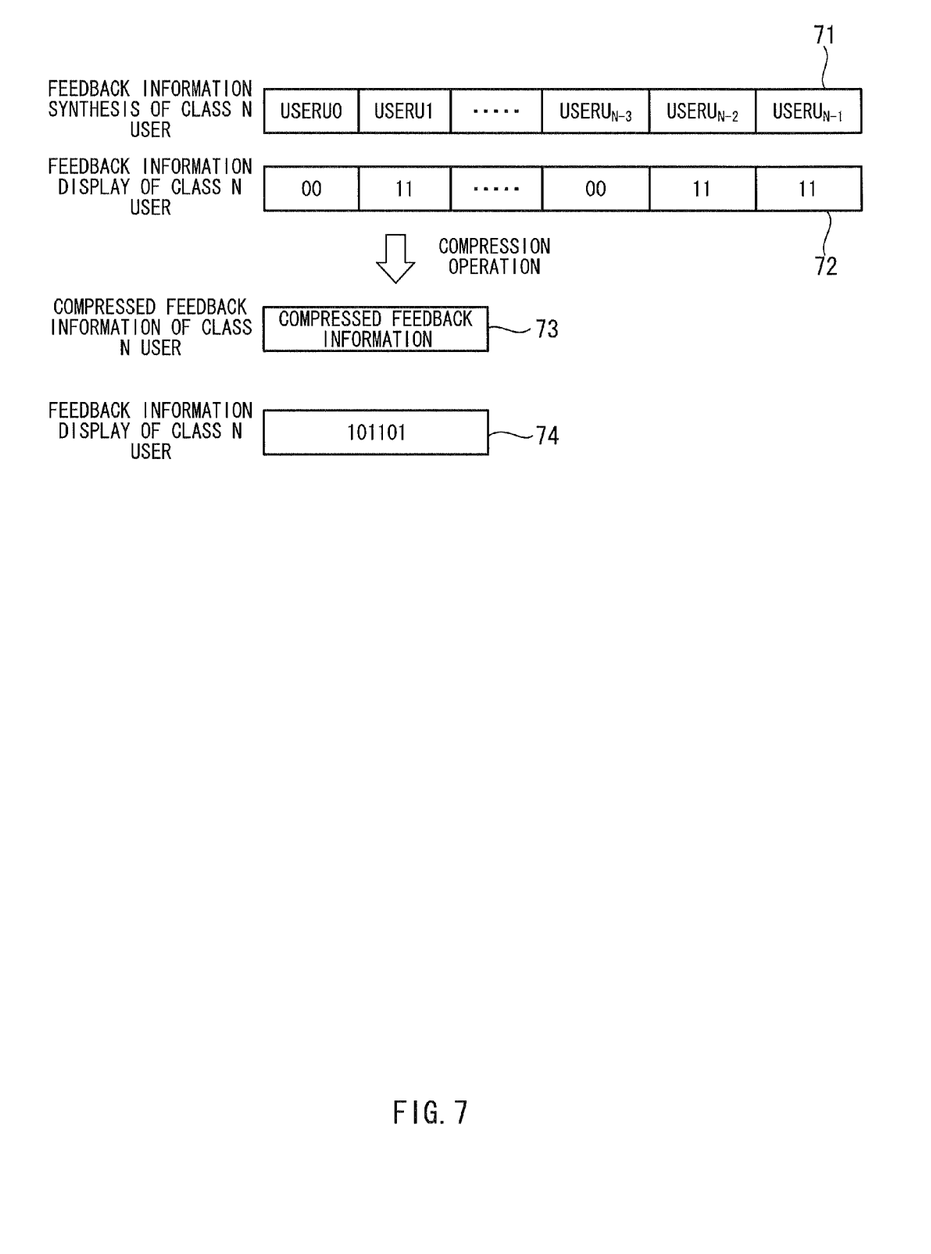
FIG. 7 shows a classified feedback information compressor of the base station part shown in FIG. 5.

In Table 1, two determination scores S1 and S2 are set, and, when a SNR value of the user is greater than S1, the user is classified in Class 1. When the SNR value of the user is S1 or between S1 and S2, the user is classified in Class 2. Also, the SNR value of the user is S2 or less, the user is classified in Class 3. S1 and S2 may also be predetermined thresholds. A Class 1 user has low signal transmission rate and has more NACK information. A Class 2 user has general transmission rate and basically has the same amounts of ACK information and NACK information. A Class 3 user has high transmission rate and has more ACK information in feedback information. For example, when "11" and "00" represent an ACK and NACK, respectively, user feedback information for a Class 1 user has more 0s, user feedback information for a Class 2 user basically has the same numbers of 0s and 1s, and user feedback information for a Class 3 user has more 1s. By this means, it is possible to perform compression using an appropriate compression method based on data characteristics of each user class. For example, it is possible to perform compression on Class 3 using a method having a large compression rate for data having more 1s and perform data compression on Class 2 using a method having a large compression rate for data where the numbers of "1s" and "0s" are basically the same. FIG. 7 shows a classified feedback information compressor. 71 is a synthesis of feedback information for Class N users. When "00" represents an ACK and "11" represents an NACK, feedback information data for the user of this class is as shown as 72. After the compression operations, the compressed user feedback information 73 is obviously shortened, and the compressed feedback information 74 can be represented by only six bits of 101101.

Figure 8:
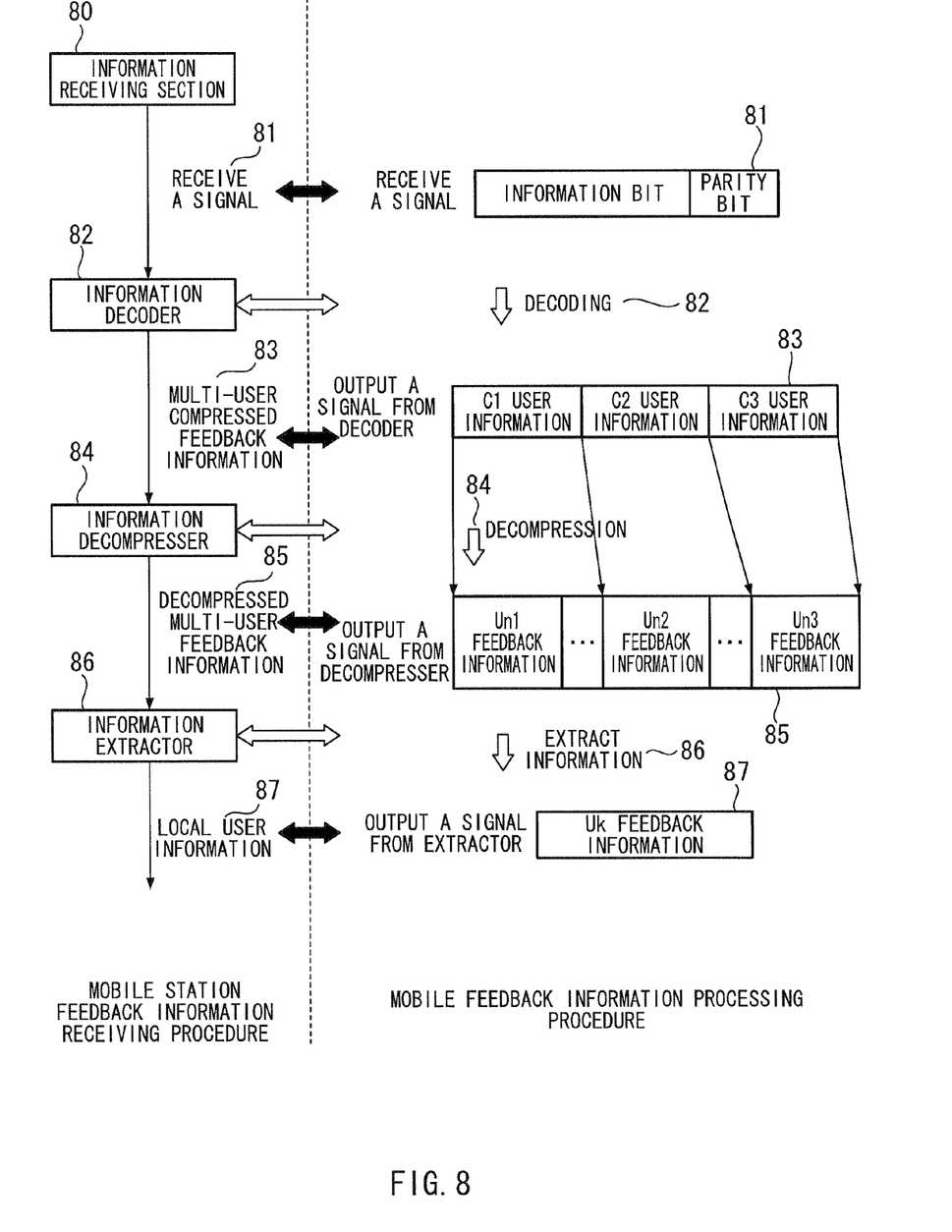
FIG. 8 shows a feedback information receiving processor and an information processing step of the mobile station part shown in FIG. 5.

FIG. 8 shows a feedback information receiving processor and an information processing steps of a mobile station. The left diagram shows a feedback information receiving processor of the mobile station part in FIG. 5, and the right diagram shows steps of processing performed on feedback information by a mobile station. The left and the right correspond to each other, and the white bold arrows in the center show the corresponding apparatuses and steps, and the black bold arrows show the corresponding relationships of information to be processed. Information receiving section 80 of the mobile station first receives multi-user feedback information 81 transmitted from the base station, and the received information is comprised of information bits and parity bits. Decoder 82 first decodes the received data and removes the parity bits. The decoded information is synthesis 83 of feedback information of users of each of the types. Information decompressor 84 decompresses the decoded data and, after the decompression, returns the result to multi-user synthesized feedback information 85. Feedback information extractor 86 then extracts feedback information 87 required at this mobile station.

Although the present invention has been described by providing an example of a typical embodiment, it should be understood by those skilled in the art that various modifications, replacements, and additions may be made without departing from the spirit and the scope of the present invention. Accordingly, the present invention is defined by the claims attached and should not be understood to be limited by the above-described specific embodiment.

The invention claimed is:

1. A method of classifying, synthesizing and transmitting multi-user feedback information at a base station, the method comprising the steps of:
   generating, for each of a plurality of users, a piece of feedback information;
   making a plurality of user groups by classifying users according to a ratio of positive to negative feedback;
   synthesizing, for each of the plurality of user groups, one or more pieces of feedback information, each of which is to be transmitted to a user belonging to the user group;
   compressing each of the pieces of synthesized feedback information using a compression method based on characteristics of the synthesized feedback information;
   re-synthesizing the compressed feedback information;
   encoding the re-synthesized feedback information; and
   transmitting the encoded re-synthesized feedback information to the users,
   wherein a different compression method is used for each user group based on the respective ratio of positive to negative feedback of the user group.

2. The method according to claim 1, wherein the users are further classified based on is transmission rates of the users, and users of the same transmission rate are one type.

3. The method according to claim 1, wherein the users are further classified based on SNR values of user signals, and users in the same SNR value range are one type.

4. The method according to claim 1, wherein the users are further classified based on Doppler shifts of the users, and users in the same Doppler shift range are one type.

5. The method according to claim 1 further comprising compressing the synthesized feedback information for each user group, using a different compression method according to characteristics of the synthesized feedback information.

6. The method according to claim 5, wherein the compression method comprises a compression coding algorithm that shortens the length of information.

7. The method according to claim 1, wherein the encoding is error correction coding.

8. The method according to claim 1, wherein the feedback information is ACK/NACK information.

9. A base station that classifies, synthesizes, and transmits multi-user feedback information, the base station comprising:

a feedback information generator that generates, for each of a plurality of users, a piece of feedback information;

a classifier that makes a plurality of user groups by classifying users based on a ratio of positive to negative feedback;

a first synthesizer that generates synthesized feedback information, by synthesizing, for each of the plurality of user groups, one or more pieces of feedback information each of which is to be transmitted to a user belonging to the user group;

a compressor that generates compressed feedback information, by performing data compression on each of the pieces of synthesized feedback information using a compression method based on characteristics of the synthesized feedback information;

a second synthesizer that re-synthesizes the compressed feedback information;

an encoder that encodes the re-synthesized feedback information; and a transmitter that transmits the encoded re-synthesized feedback information to the users, wherein a different coin ession method is used for each user group based on the respective ratio of positive to negative feedback of the user group.

10. The base station according to claim 9, wherein the users are further classified based on transmission rates of users, and users of the same transmission rate are one type.

11. The base station according to claim 9, wherein the users are further classified based on SNR values of user signals, and users in the same SNR value range are one type.

12. The base station according to claim 9, wherein the users are further classified based on Doppler shifts of the users, and users in the same Doppler shift range are one type.

13. The base station according to claim 9, wherein the compression method is a compression coding algorithm that shortens the length of information.

14. The base station according to claim 9, wherein the feedback information is ACK/NACK information.

* * * * *